United States Patent [19]
Hayakawa et al.

[11] Patent Number: 5,540,991
[45] Date of Patent: Jul. 30, 1996

[54] COMPOSITE INSULATOR AND ITS MANUFACTURING METHOD

[75] Inventors: Koji Hayakawa, Handa; Hiroshi Kashiwagi, Nagoya, both of Japan

[73] Assignee: NGK Insulators, Ltd., Japan

[21] Appl. No.: 487,554

[22] Filed: Jun. 7, 1995

[30] Foreign Application Priority Data

Dec. 27, 1994 [JP] Japan .................................. 6-325465

[51] Int. Cl.⁶ .................................................. D02G 3/00
[52] U.S. Cl. .................... 428/370; 174/174; 174/178; 174/179; 174/181; 425/116; 428/375
[58] Field of Search .................................. 428/370, 375; 174/174, 178, 179, 181; 425/116

[56] References Cited

FOREIGN PATENT DOCUMENTS 60-500929  6/1985  Japan .
6-203680  7/1994  Japan .

*Primary Examiner*—N. Edwards
*Attorney, Agent, or Firm*—Parkhurst, Wendel & Burr

[57] ABSTRACT

A composite insulator includes a FRP core rod and a sheath which is formed by integrally molding an insulating polymeric material to cover the core rod over substantially the entire length thereof. The sheath is composed of a plurality of molded portions which are aligned with each other in the axial direction of the core rod. Adjacent molded portions of the sheath are arranged relative to each other so that a gap is left between the opposite ends of the molded portions. The gap is filled by a joint insulating material which is integrally united to the polymeric material of the adjacent molded portions.

4 Claims, 4 Drawing Sheets

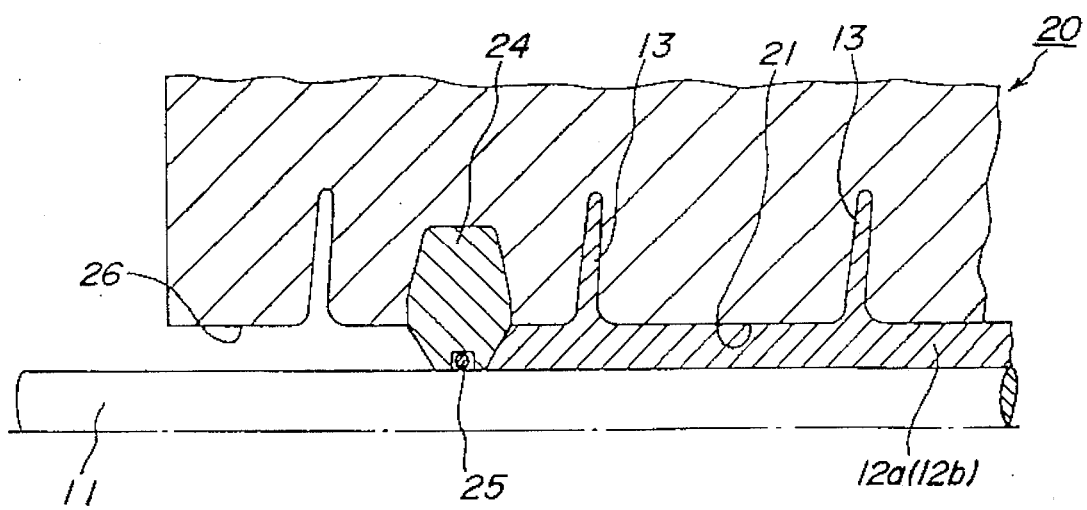
FIG_3
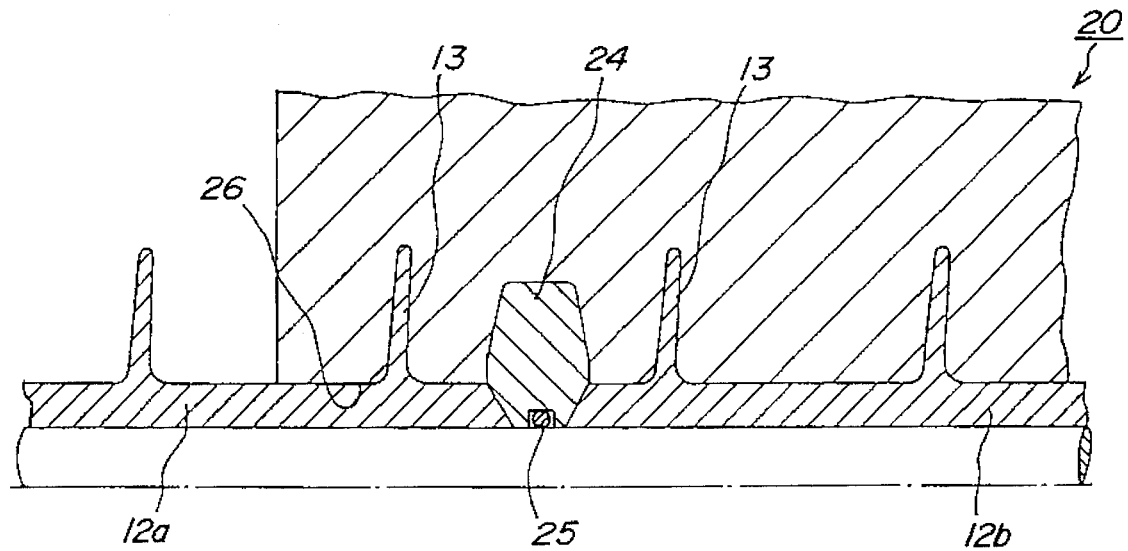
FIG_4

COMPOSITE INSULATOR AND ITS MANUFACTURING METHOD

BACKGROUND OF THE INVENTION

1. Field of the Invention

The present invention relates to an elongate composite insulator which comprises an elongate core rod composed, e.g., of a fiber-reinforced plastics (FRP), a sheath which covers the core rod over substantially the entire length thereof, and a plurality of sheds which are formed on the sheath and spaced from each other in the axial direction of the core rod, wherein the sheath and the sheds are formed by integrally molding of an insulating polymeric material. The present invention also relates to a method for manufacturing such composite insulators.

2. Description of the Related Art

There is known a composite insulator which can be obtained by integrally providing an elongate core rod of fiber-reinforced plastics (FRP) with a sheath and sheds by an injection molding of an appropriate insulating polymeric material such as silicone rubber, ethylene propylene copolymer (EPM), ethylene propylene diene copolymer (EPDM), polyurethane, etc. Such a composite insulator has been actually put into practical applications, particularly in any use environment which can draw out various functional advantages of the composite insulator. As for the injection molding method for manufacturing such composite insulators, various improvements have been conventionally proposed.

For manufacturing relatively short composite insulators of a low withstand voltage class, there has been conventionally adopted a method in which a core rod is placed within a mold cavity of a molding machine and a raw material in the form of an insulating polymeric material, e.g., an unvulcanized rubber, is injected into the mold cavity to integrally form a sheath and sheds on the core rod (see JP-A-60-500929, for example). In the case of a longer composite insulator to which a high withstand voltage is required, however, it is generally difficult to obtain an elongate molded product through a single molding process due to a restriction in length of the mold, for example.

In order to eliminate such a difficulty and allow a simplified and facilitated manufacture of elongate composite insulators with a satisfactory quality, JP-A-6-203680 discloses the applicant's earlier proposal wherein an axially continuous sheath of an elongate composite insulator is formed in a stepwise manner. In this instance, a FRP core rod is placed only partly within a mold cavity of a molding machine, and a first molded portion corresponding to a part of the sheath and sheds is formed on that portion of the core rod which is situated within the mold cavity. The core rod is subsequently displaced in the axial direction by a predetermined amount relative to the mold and a second and succeeding molded portions are formed, which are similar to the first molded portion, with the respective molded portions being simultaneously integrated with each other so that an elongate composite insulator has an axially continuous sheath and associated sheds.

According to the applicant's earlier proposal mentioned above, because an axially continuous sheath having a desired length is formed by integrating a plurality of molded portions which are succeedingly formed on the core rod in axial alignment with each other, it is possible to manufacture an elongate composite insulator having a high accuracy and an excellent insulating property, in a facilitated and simplified manner, without increasing the length of the mold.

As disclosed in JP-A-6-203680, the molding machine capable of manufacturing elongate composite insulators according to the above-mentioned proposal includes an end forming member arranged in a rear end portion of a mold cavity, for forming a rear end of a molded portion which forms an integral part of the sheath. A space for accommodating a front end region of the molded portion is provided adjacent to a front end portion of the metal mold cavity. A first jig for forming a head portion of the sheath, and a second jig for positioning the core rod relative to the mold by clamping the front end of the molded portion can be selectively attached to and removed from the front end of the mold cavity. In this instance, the second jig at the front end of the mold cavity may be composed of a set of arcuate or semi-circular segments which serve to prevent a leakage of the polymeric material which has been injected into the mold cavity.

When an elongate composite insulator is manufactured with the above-mentioned known molding machine, the first jig is attached to the front end portion of the mold cavity and a first molded portion having a head and a rear end is formed on the core rod. The core rod is then displaced in the axial direction and the first jig in the front end of the mold cavity is replaced by the second jig. Subsequently, the second molded portion is formed on the core rod with the rear end of the first molded portion clamped by the second jig and the core rod positioned relative to the mold. In this instance, the second molded portion is formed with its front end tightly sealed to, and directly united with the rear end of the first molded portion. Therefore, even though the sheath and the sheds are molded as axially divided pieces, the adjacent molded portions are united with each other to provide an axially continuous sheath and an excellent insulating property of the composite insulator.

The process for manufacturing the composite insulators according to the applicant's earlier proposal proved to be highly advantageous in that elongate products with a high accuracy and an excellent insulating property can be produced in a facilitated and simplified manner, without increasing the length of the mold, under appropriately adjusted mold conditions. Still, it would be desirable to enable a more reliable manufacture of the composite insulator having a further improved product quality, while maintaining the advantage of the earlier proposal.

SUMMARY OF THE INVENTION

It is therefore an object of the present invention to provide a composite insulator with a further improved product quality, as well as a method for manufacturing method such composite insulator.

The inventors thoroughly conducted various studies and investigations seeking for a solution of such a problem, which led to the following recognitions.

First of all, during formation of a second or subsequent molded portion after a first or preceding molded portion has been formed in the course of production of a composite insulator in accordance with the applicant's earlier proposal, it has been found that the supporting reaction force at both ends of the second or subsequent molded portion may become unbalanced depending upon the manufacturing conditions. This is at least partly because the rear end of the subsequent molded portion is supported by the end forming member which is relatively hard, whereas the front end of the subsequent molded portion is supported by the rear end of a preceding molded portion which as a whole is relatively soft. Such unbalanced supporting condition tends to generate an axial force which is applied to the molded portion thereby causing occurrence of undesirable deformation, peeling-off or cracks of the mold portions.

Secondly, it has also been found that when an excessively high injection pressure is applied during the molding process, the segments forming the second jig at the front end of the metal mold cavity may not adequately prevent leakage of the injected resin as intended, with the result that the leaked resin tends to adhere to the outer surface of the molded portions, thereby forming products with inferior quality.

The inventors also found that, in order to constantly enable production of composite insulators having a satisfactory quality without involving the above-mentioned difficulties, it would be effective to ensure that the injection pressure during formation of a succeeding molded portion is not directly applied to the rear end of the preceding molded portion and, in particular, to integrate the adjacent molded portions after the molding process.

On the basis of these recognitions, the present invention in its first aspect provides an improved composite insulator which comprises a core rod, a sheath which covers the core rod over substantially the entire length thereof, and a plurality of sheds which are formed on the sheath and spaced from each other in the axial direction of the core rod, wherein the sheath and the sheds are formed on the core rod by integrally molding an insulating polymeric material, and the sheath is comprised of a plurality of molded portions which are aligned with each other in the axial direction of the core rod. According to the present invention, adjacent molded portions of the sheath are provided with opposite ends which are arranged relative to each other so as to leave a predetermined gap therebetween, and the gap is filled by a joint insulating material which is integrally united to the polymeric material of the adjacent molded portions.

The present invention in its second aspect provides an improved method for manufacturing a composite insulator which comprises a core rod, a sheath which covers the core rod over substantially the entire length thereof, and a plurality of sheds which are formed on the sheath and spaced from each other in the axial direction of the core rod, wherein the sheath and the sheds are formed on the core rod by integrally molding an insulating polymeric material, and the sheath is comprised of a plurality of molded portions which are aligned with each other in the axial direction of the core rod. The method according to the present invention comprises the steps of (i) forming a first molded portion of the sheath on the core rod and subsequently forming a second molded portion of the sheath on the core rod adjacent to the first molded portion so that a predetermined gap is left between opposite ends of the first and second molded portions of the sheath, and (ii) filling a joint insulating material in the gap between the opposite ends of the adjacent molded portions, and integrally uniting the joint insulating material with the polymeric material of the adjacent molded portions.

According to the present invention, the sheath which covers the core rod over substantially the entire length thereof is formed by successively forming a plurality of molded portions in alignment with each other in the axial direction of the core rod, with a gap left between opposite ends of the adjacent molded portions, and subsequently integrating the molded portions by filling a joint insulating material in the gap. Therefore, the injection pressure is not directly applied to the rear end of the preceding molded portion when forming the succeeding molded portions among a plurality of the molded portions forming the sheath. The present invention thus makes it possible to positively prevent occurrence of deformation, peeling-off or cracks of the molded portion during formation of the succeeding molded portions, and the leakage of the polymeric material in the front end portion of the mold cavity, thereby effectively avoiding occurrence of defective products due to adhesion of the leaked polymeric material to the outer surface of the molded product.

BRIEF DESCRIPTION OF THE DRAWINGS

The present invention will now be explained in further detail hereinafter, with reference to certain preferred embodiments shown in the accompanying drawings, in which:

FIG. 3 is a longitudinal sectional view showing a front end portion of the mold cavity during formation of a molded portion on a core rod;

FIG. 4 is a sectional view similar to FIG. 3, showing the front end portion of the mold cavity during formation of a succeeding molded portion;

DETAILED DESCRIPTION OF THE PREFERRED EMBODIMENTS

Figure 1:
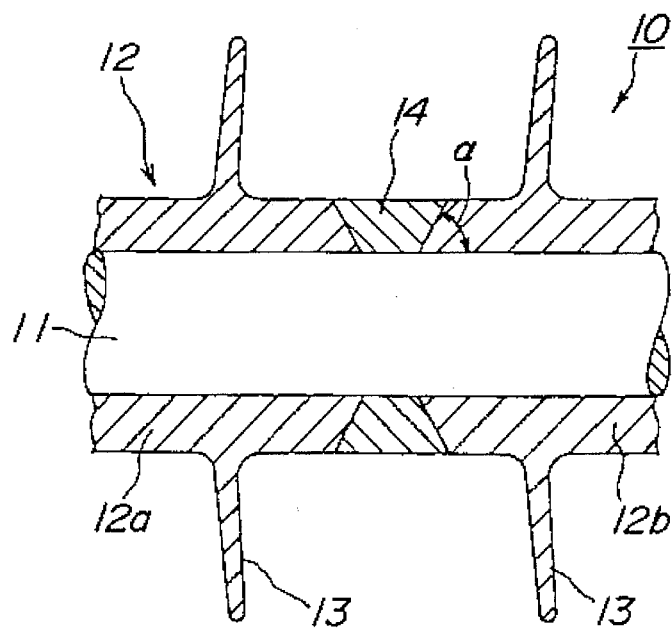
FIG. 1 is a longitudinal sectional view showing part of a composite insulator according to one embodiment of the present invention.

Referring now to FIG. 1, there is shown a part of a composite insulator 10 according to one embodiment of the present invention. The composite insulator 10 includes an elongate core rod 11, a sheath 12 which covers the core rod 11 over substantially the entire length thereof, and a plurality of sheds 13 which are formed on the sheath and spaced from each other in the axial direction of the core rod 11. The core rod 11 consists of fiber-reinforced plastics or appropriate thermosetting resin such as epoxy resin. The sheath 12 and the sheds 13 are integral formed by molding appropriate insulating polymeric material, such as silicone rubber, ethylene propylene copolymer (EPM), ethylene propylene diene copolymer (EPDM) or polyurethane. The sheath 12 is comprised of a plurality of molded portions 12a and 12b which are continuously aligned in the axial direction of the core rod 11. Metal fittings (not shown) are fixedly secured to both end portions of the core rod 11 in a manner known, per se.

In accordance with the present invention, opposite ends of adjacent molded portions 12a and 12b of the sheath 12, i.e., the right end of the molded portion 12a shown on the left side in FIG. 1 and the left end of the molded portion 12b shown on the right side in FIG. 1, are arranged relative to each other so as to leave an annular gap therebetween. A joint insulating material 14 is filled in the gap between the opposite ends of the adjacent molded portions 12a and 12b over the entire circumference of the gap, and the joint insulating material 14 is integrally united with the resin forming the molded portions 12a and 12b. In this instance, it is preferable for the opposite ends of the adjacent molded portions 12a and 12b of the sheath 12 to have slant surfaces which form a predetermined angle α with respect to the center axis of the core rod 11, e.g., approximately 60°. Thus, the opposite ends of the adjacent molded portions 12a and 12b of the sheath 12 are spaced from each other by an axial distance which gradually increases radially outwardly of the insulator 10.

In the composite insulator 10 having the above-mentioned structure, since the adjacent molded portions 12a and 12b are integrated with each other through the joint insulating material 14, it is possible to assure the continuity of the sheath 11 and thereby realize an excellent insulating property of the insulator 10 as a whole. Furthermore, according to the present invention, the molded portions 12a and 12b are successively formed in alignment with each other in the axial direction of the long core rod 11, and subsequently integrated with each other so as to stepwise form an elongate and yet continuous sheath 12 with a predetermined length, as will be more fully explained hereinafter. Therefore, it is possible to manufacture elongate composite insulators having high accuracy and excellent properties, in a facilitated and simplified manner, without increasing the length of the mold of the molding machine.

A method for manufacturing the composite insulator 10 having the above-mentioned structure, and an apparatus which can be suitably used for embodying the method will now be explained in further detail with reference to FIGS. 2 to 7.

First of all, an apparatus which can be suitably used for manufacturing the composite insulator 10 according to the present invention comprises a molding machine which includes a mold 20 having the basic configuration similar to that disclosed in the above-mentioned JP-A-6-203680. Thus, as particularly shown in FIGS. 2 and 3, the mold 20 has an inner surface defining a mold cavity 21 of a shape which corresponds to the sheath 12 and the sheds 13 on the core rod 11. The mold 20 serves to successively form the molded portions 12a and 12b corresponding to the sheath 12 and the sheds 13 associated with the respective molded portions 12a and 12b, by injecting an insulating polymeric material (such as silicone rubber) into the cavity 21, with the core rod 11 positioned at a predetermined axial location with respect to the cavity 21.

Figure 2:
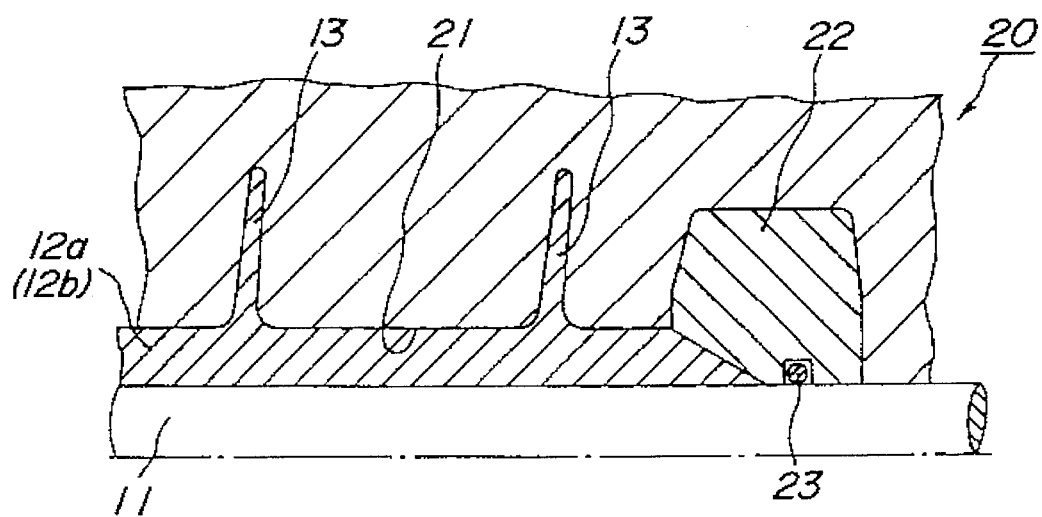
FIG. 2 is a longitudinal sectional view showing a rear end portion of a mold cavity during formation of a molded portion on a core rod.
Figure 5:
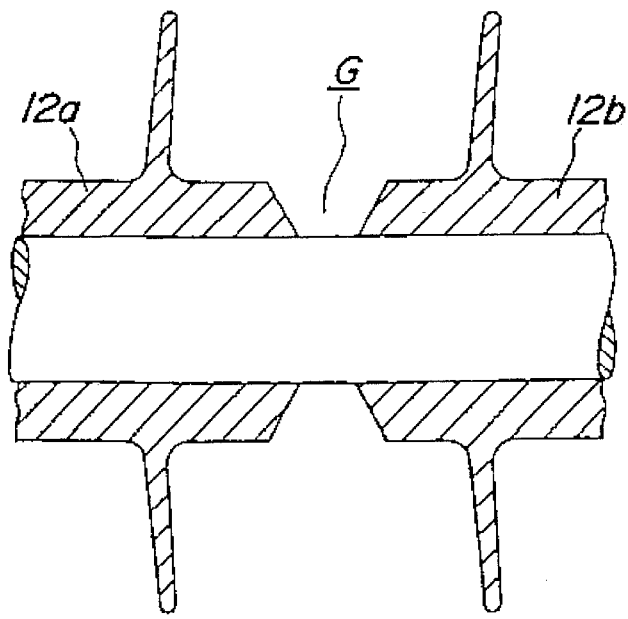
FIG. 5 is a longitudinal sectional view showing the core rod removed from the mold after adjacent molded portions have been molded.

As shown in FIG. 2, the mold cavity 21 has a rear end portion (the right end portion in the drawing) which is provided with an annular ring 22 as a rear end forming member for forming the rear ends of the molded portions 12a and 12b corresponding to the sheath 12. The annular ring 22 has an inner periphery which is provided with a seal ring 23 for preventing leakage of the polymeric material through a gap between the ring 22 and the core rod 11. Similarly, as shown in FIG. 3, the mold cavity 21 has a front end portion (the left end portion in the drawing) which is provided with an annular ring 24 as a front end forming member for forming the front ends of the molded portions 12a and 12b or the head portion of the sheath 12 when the molded portion 12a is the first and foremost molded portion. The annular ring 24 has an inner periphery which is provided with a seal ring 25 for preventing leakage of the polymeric material through a gap between the ring 24 and the core rod 11. Furthermore, a space 26 is provided adjacent to the front end portion of the mold cavity 21, for accommodating the rear end of a preceding molded portion 12a and 12b when the core rod 11 is displaced in the axial direction with respect to the cavity 21.

The annular rings 22 and 24 at the both end portions of the mold cavity 21 may have a split structure, each constituted by a pair of semi-circular segments. The seal rings 23 and 25 for such annular rings 22 and 24 may be comprised, e.g., of polytetrafluoroethylene (PTFE) and may have a similar split structure. Moreover, the annular ring 22 for the rear end portion of the mold cavity 21 may have an integral construction, and combined with a seal ring 23 which is comprised, e.g., of a heat resistant fluoro rubber. When the ends of the respective molded portions 12a and 12b of the sheath 12 is formed to have a slant surface, the inner end surfaces of the annular rings 22 and 24 are also formed into a slant surface.

With a molding machine which includes the mold 20 having the above-mentioned structure, the composite insulator 10 according to the present invention can be produced by stepwise forming the sheath 12 and the sheds 13 on the core rod 11 in the following manner.

At the outset, in the first step, the annular rings 22 and 24 are fastened to the core rod 11 at the front and rear end portions of the cavity 21 with the mold 20 opened. The core rod 11 is positioned at a predetermined axial location with respect to the cavity 21, and the mold 20 is then closed in a manner known, per se. The insulating polymeric material is injected into the cavity 21 from gates (not shown) of the mold 20 which are situated at locations corresponding, e.g., to the rear surfaces of the sheds 13 of the insulator 10. The polymeric material injected into the cavity 21 is cured. As a result, as shown in FIGS. 2 and 3, the foremost molded portion 12a and the sheds 13 associated therewith are integrally formed on the core rod 11.

The metal mold 20 is opened in a second step, and the annular rings 22 and 24 at the front and rear end portions of the cavity 21 are loosened. The core rod 11 then is displaced in the axial direction toward left in the drawing, by a predetermined amount with respect to the cavity 21. The annular rings 22 and 24 are then fastened to the core rod 11 in such a new relative position and the metal mold 20 is closed. In this instance, the foremost molded portion 12a and the shed portions 13 associated with that molded portion 12a, which have already been formed in the first step, are accommodated in the space 26 having each ends situated adjacent to the front end portion of the cavity 21. When the insulating polymeric material is injected into the cavity 21 and cured in such a state, the second molded portion 12b the sheds 13 associated with such second molded portion 12b are integrally formed on the core rod 11. The second molded portion 12b formed as above has a front end which is as shown in FIG. 4, and a rear end which is similar to that of the foremost molded portion 12a shown in FIG. 2.

The second step may be repeated, if necessary, to sequentially form a predetermined number of the successive molded portions on the core rod 11, corresponding to the full length of the insulator to be produced.

In a third step, the core rod 11, which has been sequentially formed with a predetermined number of the molded portions 12a and 12b is removed from the mold 20. As apparent from FIG. 5, the rear end of the preceding molded portion 12a is axially spaced from the front end of the succeeding molded portion 12b adjacent thereto, by a distance which corresponds to the thickness of the annular ring 24 situated at the front end portion of the mold cavity 21. Therefore, a gap G is left between the opposite ends of the adjacent molded portions 12a and 12b. It is in many cases desirable to gradually increase the axial length of the gap G, i.e., the axial distance between the opposite ends, radially outwardly of the insulator 10, as described above.

Figure 6:
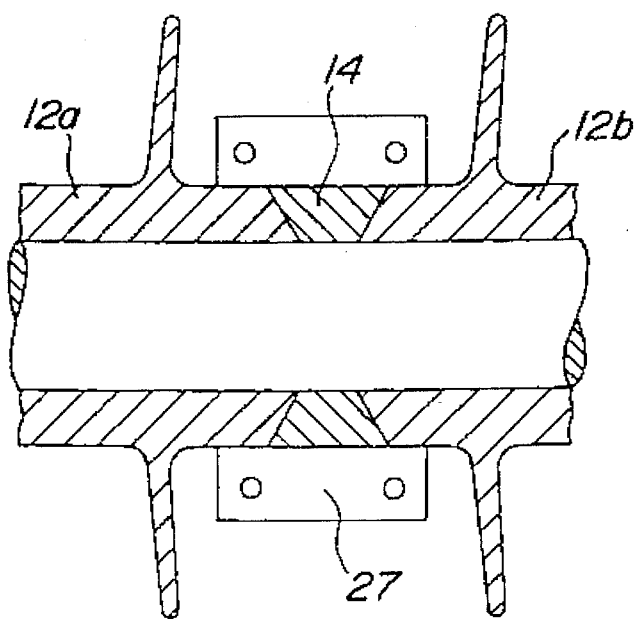
FIG. 6 is a longitudinal sectional view showing the core rod in which a joint insulating material is filled in a gap between opposite end portions of adjacent mold portions and a jig is fitted onto the outer periphery thereof.
Figure 7:
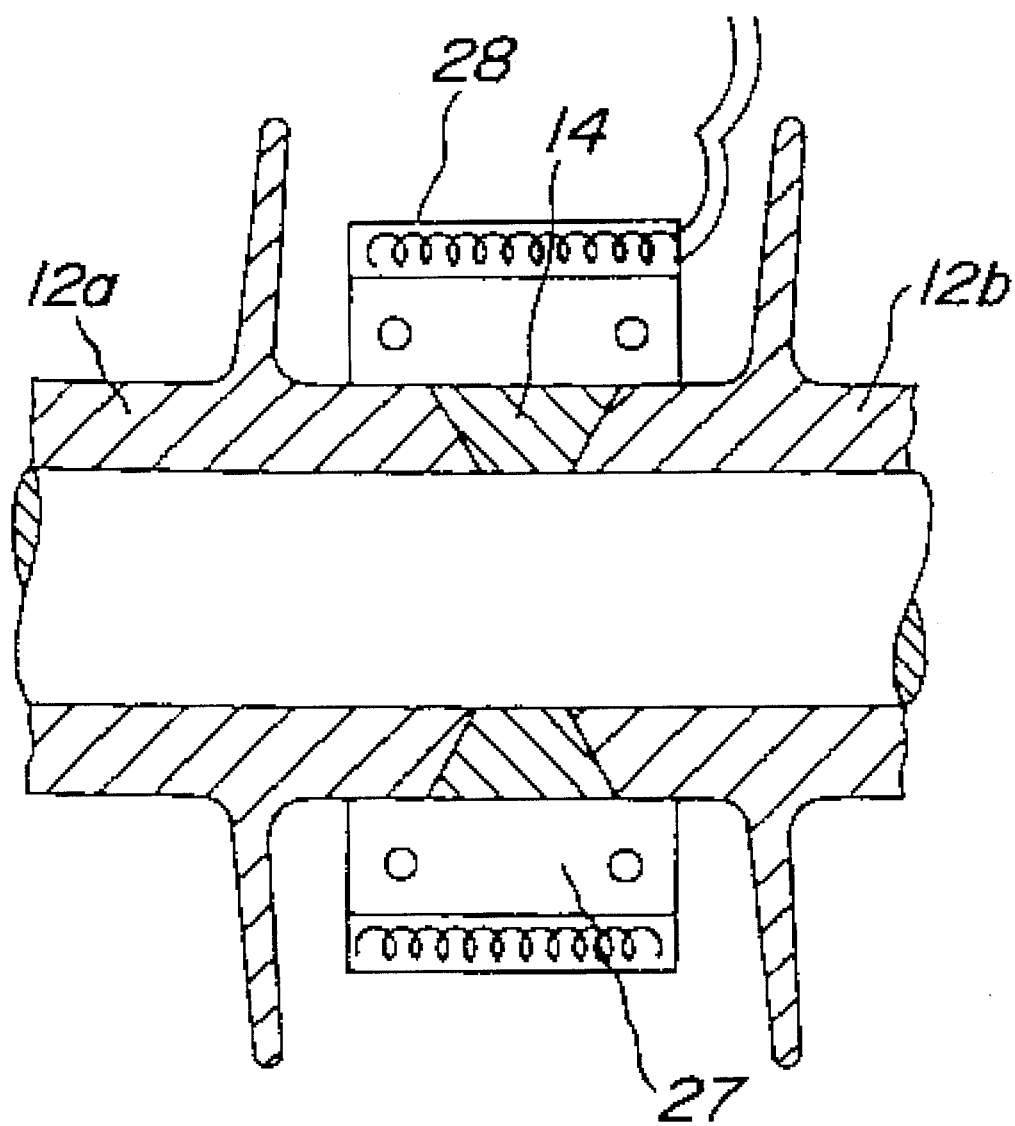
FIG. 7 is a longitudinal sectional view showing the heating process for integrating the joint insulating material with the polymeric material of the molded portions.

In a fourth step, an appropriate amount of the joint insulating material 14, which is preferably unvulcanized rubber or thermosetting resin, is filled in the gap G between the opposite ends of the adjacent molded portions 12a and 12b. An annular jig 27 is fitted to surround the outer periphery of the joint insulating material 14, bridging between the opposite ends of the molded portions 12a and 12b as shown in FIG. 6. The jig 27 may be comprised of a pair of semi-circular segments, like the annular rings 22 and 24. Furthermore, as shown in FIG. 7, after a band heater 28 is wound around the outer periphery of the jig 27, the band heater 28 is supplied with electric current to carry out a resistance heating of the joint insulating material 14 for a predetermined time. Thus, when the joint insulating material 14 is the unvulcanized rubber, the joint insulating material 14 is vulcanized by the heating. Alternatively, when the joint insulating material 14 is a thermosetting resin, the joint insulating material 14 is cured by the heating. As a result, the joint insulating material 14 is completely united with the polymeric material forming the adjacent molded portions 12a and 12b.

Finally, in the fifth step, when the joint insulating material 14 is united with the polymeric material of the adjacent molded portions 12a and 12b, the composite insulator 10 shown in FIG. 1 can be obtained by removing the band heater 28 and the annular jig 27 from the joint insulating material 14.

It will be appreciated from the foregoing description that, according to the present invention, the sheath which covers the core rod over substantially the entire length thereof is formed by succeedingly forming adjacent molded portions in alignment with each other in the axial direction of the core rod, with a gap left between opposite ends of the molded portions, and the molded portions are integrated by filling a joint insulating material in the gap so as to integrate the adjacent molded portions. Therefore, the injection pressure is not directly applied to the rear end of the preceding molded portion when forming the succeeding molded portions among a plurality of the molded portions forming the sheath.

The present invention thus makes it possible to positively prevent occurrence of deformation, peeling-off or cracks of the molded portion during formation of the succeeding molded portions, and the leakage of the polymeric material in the front end portion of the mold cavity, thereby effectively avoiding occurrence of defective products due to adhesion of the leaked polymeric material to the outer surface of the molded product.

The above-described specific embodiments were presented by way of examples only, and it is of course that various modifications and variations may be made without departing from the scope of the invention as defined by the appended claims.

For example, after the joint insulating material has been filled in the gap between the opposite ends of the adjacent molded portions and the jig has been fitted to the outer periphery thereof, the joint insulating material may be heated and integrally united with the polymeric material of the molded portions, by placing the entire core rod in an appropriate furnace, instead of employing the band heater as shown in FIG. 7.

We claim:

1. A composite insulator comprising: a core rod; a sheath which covers the core rod over substantially the entire length thereof; and a plurality of sheds which are formed on the sheath and spaced from each other in the axial direction of the core rod; said sheath and said sheds being formed on said core rod by integrally molding an insulating polymeric material; and said sheath comprising a plurality of molded portions which are aligned with each other in the axial direction of the core rod; adjacent molded portions of the sheath having opposite ends which are arranged relative to each other so as to leave a predetermined gap therebetween, said gap being filled by a joint insulating material which is integrally united to the polymeric material of said adjacent molded portions.

2. The composite insulator as set forth in claim 1, wherein the opposite ends of the adjacent molded portions of the sheath are formed as slant surfaces forming a predetermined angle with respect to a center axis of the core rod.

3. The composite insulator as set forth in claim 2, wherein said opposite ends of the adjacent molded portions of the sheath is spaced from each other by an axial distance which gradually increases radially outwardly.

4. The composite insulator as set forth in claim 3, wherein said predetermined angle of the slant surfaces with respect to the center axis of the core rod is approximately 60°.

* * * * *